UNITED STATES PATENT OFFICE.

GEORGE W. MULLEN, OF ELMHURST, NEW YORK, ASSIGNOR TO HOWARD B. BISHOP, OF SUMMIT, NEW JERSEY.

PROCESS OF RECOVERING METALLIC CONSTITUENTS FROM A MIXTURE THEREOF.

1,377,217.     Specification of Letters Patent.     Patented May 10, 1921.

No Drawing.     Application filed January 14, 1920. Serial No. 351,437.

*To all whom it may concern:*

Be it known that I, GEORGE W. MULLEN, a citizen of the United States, residing at Elmhurst, Long Island, State of New York, have invented certain new and useful Improvements in a Process of Recovering Metallic Constituents from a Mixture Thereof, of which the following is a specification.

The process relates more particularly to the art of separating the metallic constituents from white metal mattes although of course it is equally applicable to equivalent starting material. The matte from white metal smelters contains appreciable amounts of tin, copper, and lead, as well as antimony and also the usual impurities. Such matte, known as white matte, contains the metals as metals, whereas the black matte, although also containing the metals, does not contain them in the metallic state. There is also an intermediate matte known as black and white matte. All of these various mattes are suitable for the treatment to be hereinafter described. These mattes are today relatively a waste material except to the extent that the copper contents is capable of recovery by treating the matte practically as a copper bearing ore and then subjecting it to the usual processes involved in copper smelting. The recovery of tin or antimony from this waste material has not proven to be commercially feasible by any known process and it is one of the objects of the present invention to recover these white metals in an inexpensive manner so as to make it profitable by the recovery of these metals, and the sale thereof as recovered, to warrant the expense of the procedure.

The process which I employ involves in the first instance the employment of a relatively inexpensive and widely available sulfatizing material, especially niter cake, which is mixed, together with a suitable reducing agent such as coal, with the matte, the mixture being then treated in a reverberatory furnace or other suitable smelting furnace. The quantities of niter cake and carbon which are used are based upon the theoretical requirement for the particular composition of the matte under treatment with a slight excess of niter cake and carbon above the theoretical requirements. The result of this treatment is to produce sulfids of the metallic constituents of the matte. After the furnace treatment is completed, the furnace is tapped and the product, as soon as it is in a condition to be handled, is introduced into a leaching tank. Inasmuch as the tin and antimony sulfids are soluble whereas the copper and lead sulfids are insoluble, the result of this treatment is the separation of the copper and lead sulfids as solids on the one hand, from the soluble tin and antimony sulfids on the other. The liquid is decanted and filtered and the remaining insoluble material is then practically a copper matte known to copper smelters and suitable for converter use and having a ready market value.

The solution which remains is then preferably exposed to the action of an electric current with standard types of anodes and cathodes, the result of which treatment is that the antimony is deposited and consequently extracted in solid form. The remaining fluid now contains the tin sulfid free from copper, lead and antimony sulfids. By adding an excess of sulfuric acid (or other proper acid) the tin sulfid is precipitated. After filtration this precipitated matter is roasted and the resulting tin oxid is smelted with a reducing agent for the recovery of tin alone.

Instead of separating the antimony by the electric treatment, the tin and antimony sulfids may be precipitated together, filtered, roasted, and the oxid smelted with reducing agents.

As one of the main objects of this process is the recovery of tin, the starting material may be a tin ore or the slag from tin smelters, the slag from solder melting processes or mixtures of ore, matte or slags with other tin bearing material and such other suitable starting material as responds to the action of niter cake to produce metal sulfids, the principle of the present invention being dependent upon the reaction between metallic material, a reducing agent and niter cake or an equivalent thereof to produce sulfid and the subsequent handling of the sulfids to recover the metal therefrom.

What I claim is:

1. The process of recovering metallic constituents from a mixture containing, among others, tin, which consists in reducing the mixture with a sulfatizing material such as niter cake, and a reducing agent, for the production of sulfids of the respective metal constituents of the mixture, digesting the product with water and thus separating the soluble from the insoluble sulfids, withdrawing the insoluble sulfids, converting the soluble sulfids into oxids of their metals and recovering the metals therefrom by smelting with a reducing agent.

2. The process of recovering metallic constituents from a mixture containing, among others, tin, which consists in reducing the mixture with a sulfatizing material, such as niter cake, and a reducing agent for the production of sulfids of the respective metal constituents of the mixture, digesting the product with water and thus separating the soluble from the insoluble sulfids, withdrawing the insoluble sulfids, passing electric current through the solution containing the soluble sulfids, precipitating the remaining sulfids from the remaining solution and recovering the metal constituents thereof.

3. The process of recovering metallic constituents from tin-bearing material which consists in reducing the mixture with niter cake and a reducing agent for the production of tin sulfid and recovering the tin from the tin sulfid thus produced.

4. The process of recovering metallic constituents from metalliferous material, which consists in reducing the mixture with niter cake and a reducing agent for the production of sulfids and then treating the sulfids thus produced for the recovery of the metals.

In witness whereof I have hereunto set my hand.

GEORGE W. MULLEN.